Nov. 7, 1967    G. E. CHRISTIN    3,351,373
HABITABLE VEHICLE

Filed Nov. 10, 1965    6 Sheets-Sheet 1

INVENTOR
GEORGES ETIENNE CHRISTIN

BY
Woodhams, Blanchard and Flynn
ATTORNEYS

Nov. 7, 1967  G. E. CHRISTIN  3,351,373
HABITABLE VEHICLE

Filed Nov. 10, 1965  6 Sheets-Sheet 2

INVENTOR
GEORGES ETIENNE CHRISTIN

BY
Woodhams, Blanchard and F. Lynn
ATTORNEYS

Nov. 7, 1967 G. E. CHRISTIN 3,351,373
HABITABLE VEHICLE

Filed Nov. 10, 1965 6 Sheets-Sheet 4

INVENTOR
GEORGES ETIENNE CHRISTIN
BY
Woodhams Blanchard & Flynn
ATTORNEYS

Nov. 7, 1967    G. E. CHRISTIN    3,351,373
HABITABLE VEHICLE

Filed Nov. 10, 1965    6 Sheets-Sheet 5

INVENTOR
GEORGES ETIENNE CHRISTIN
BY
Woodhams, Blanchard & Flynn
ATTORNEYS

United States Patent Office 3,351,373
Patented Nov. 7, 1967

3,351,373
HABITABLE VEHICLE
Georges Etienne Christin, Marnes-la-Coquette, France, assignor to Etablissements Bertrand Faure, Puteaux, Seine, France, a corporation of France
Filed Nov. 10, 1965, Ser. No. 507,160
Claims priority, application France, Nov. 10, 1964, 994,509, Patent 1,422,283
10 Claims. (Cl. 296—23)

ABSTRACT OF THE DISCLOSURE

A habitable vehicle having an essentially tubular central wall structure which forms the roof, floor and two sides of a travel trailer. Box-frame end wall units are located transversely at the forward and rearward ends of the wall structure to rigidify and complete the enclosure. At least one wall unit consists of two walls so arranged that one wall provides a partition which is designed to carry interior fittings and is provided with a door opening therein. The other wall of the wall unit, which functions as an outside wall and is hingedly secured to the lower edge of the body structure, forms an end gate designed to swing downwardly into a horizontal position where it can serve as a floor. Hood means are provided for enclosing the additional living space provided above the horizontally disposed, outside end wall.

---

This invention relates in general to an improved habitable vehicle and, more especially although not exclusively, to vehicles known as caravans or travel trailers, to which reference is made in the following description only by way of example and not in any limiting sense.

Travel trailers could be utilized to an appreciably greater extent if a certain number of serious disadvantages were removed. For example, existing vehicles of this type are often too heavy and in most instances their weight does not correspond in a proper or predetermined manner to the power of the motor vehicle to which they are attached and by which they are pulled.

Similarly, the ground space occupied by existing travel trailers either when they are being drawn or when they are not in use is often excessive, thus giving rise to difficulties in movement and/or parking of the travel trailers particularly on mountain roads. Such difficulties are magnified by the fact that the driver of the drawing vehicle cannot make use of his regular rear view mirror when a travel trailer is attached thereto. Moreover, the capital outlay is often excessive in view of the short periods of use of the travel trailer and the relatively long periods of nonuse.

The substantial weight and over-all size of a completely adequate travel trailer make it impracticable to employ this latter on most types of itinerant journeys. In spite of the increasingly larger living areas which are now provided in travel trailers, it has not been possible, or at least feasible, up to the present time to isolate sleeping areas in a suitable manner to insure requisite privacy, despite the fact that the berths or beds are usually made too small in an effort to provide some privacy.

In any case, from the point of view of interior planning, the solutions adopted always constitute compromises which do not prove satisfactory since cupboard space, cooking space and toilet space must all be reduced to an absolute minimum in order to provide even minimum sleeping accommodations.

A further disadvantage of existing travel trailers lies in their high cost, even when they are manufactured in large-scale production. Owing to the essentially parallelipipedal body structures adopted in designs of the prior art, builders of travel trailers have also had to provide strong brace structures along the four vertical edges in addition to those brace structures which are necessary along the horizontal edges.

Furthermore, interior furnishings must be placed in or removed from the travel trailers through conventional openings, such as doors or windows, which in turn limits the use and replacement of furnishings, and prefabricated units of substantial size must be installed before the outer shell is completed, which creates many problems.

The object of the present invention is to overcome the above-mentioned disadvantages my making available a travel trailer which can be produced at a reasonable cost, which is of small over-all size when being moved, yet offers during use a very substantial living space, suitably divided, with cupboards or storage spaces which are of adequate size and designed according to the number of persons which the travel trailer is intended to accommodate.

With this object in mind, a habitable vehicle in accordance with the invention is characterized by the fact that it has an essentially tubular, central body structure which forms the roof, floor and two side walls of the travel trailer. The wheel system, drawbar system and certain fittings are mounted upon this central body structure, the ends of which are covered by transverse box-frame wall units provided at the forward and rearward ends of the body structure. At least one wall unit consists of two walls so arranged that one wall provides within the said body structure a partition which is designed to carry interior fittings and is provided with an opening. The other wall of the wall unit serves as the outside wall which is hingedly secured to the lower edge of the body structure and forms an end gate designed to swing downwardly into a horizontal position. Hood means is provided for enclosing the additional living space thus provided above the horizontally disposed, outside wall. Furthermore, the additional living space provided in this manner is separated from the main or fixed living space by a partition provided with an opening in which a door can be fitted. By virtue of this essentially tubular body structure, a travel trailer of this type can readily be manufactured in large-scale production at a reasonably low cost. Also, provision can be made in the said travel trailer for prefabricated interior furnishings of substantial size which are installed through an open end of the body structure prior to the installation of one of the wall units in position.

Finally, the tubular body structure is endowed with strength and rigidity by the inner and outer end walls in the wall units, which can also be prefabricated.

According to a preferred embodiment, the vehicle has two wall units which make it possible to obtain additional living space both at the forward end and at the rearward end of the central, rigid body structure.

According to another embodiment, the vehicle has one wall unit which makes it possible to obtain one additional living area preferably at the rear end thereof. The other wall unit comprises an inner partition wall designed to carry interior fittings and an outside wall which is permanently and preferably attached to the front edge of the body structure.

The construction of the central body structure and the end wall units is such that either one type or the other, namely, vehicles having either one or two additional living areas, can be included in the same production line.

It may happen that, owing to a reduction in the expected number of occupants or in the size of a family, a user may wish to dispense with the use of the additional living areas at one or both ends. In that case, the user need merely secure the two outside end walls to the two edges of the central body structure in a permanent manner.

In accordance with an improvement which comes within the scope of the invention, means are provided for rigidly securing each outside end wall to the central body structure when the said wall is in the closed position against the end edge of the said central body structure. This arrangement increases the rigidity of the travel trailer when it is being pulled. For this purpose, simple means can be employed such as, for example, sufficiently strong latch mechanisms by means of which the outside end wall is forcibly held against the corresponding edge of the body structure.

As a further feature, the means for closing off each additional living area consists of a folding hood which is attached or attachable to the periphery of the outside end wall and to the end edge of the central body structure, the said hood being braced by U-shaped hoops which are pivotally mounted at both ends for movement around an axis which is at least very close to the hinge axis of the outside end wall.

When in the collapsed or storage position, the hood is designed to fit within a storage space provided between the hinged end wall and the corresponding inner partition wall.

In accordance with an additional feature, the hood can be separated from the outside end wall and secured in various intermediate positions, thus permitting the conversion of the additional living space into a summer patio which is protected from the sun by the hood.

According to an alternative form, the means for enclosing the additional living space may consist of two rigid side walls hingedly connected, for example, along their lower edges to the side edges of the outside end wall. The roof and third wall may be provided by a flexible closure panel which is stored within the upper end of the end wall unit and which can be pulled outwardly and downwardly from there like a window shade.

In an advantageous embodiment of the invention, one or each of the outside end walls is equipped with two beds disposed lengthwise of the travel trailer and separated by a central passageway. Provision can accordingly be made for removable floor units which form a living room floor over the beds and passageway.

In a preferred embodiment, one or each outside end wall is adapted to support in the horizontal position thereof beds which, in the closed vertical position, are housed within the space provided between said end wall and the corresponding inner partition wall.

A travel trailer as designed in accordance with the invention can have, for example, a floor area of approximately four square meters, namely two meters in width and two meters in length, either when the travel trailer is being drawn by a motor vehicle or when it is not in use. At the time of use, however, the same travel trailer can have a living area of 12 square meters after the outside end walls have been swung downwards, this operation being performed in a very short time and thereby permitting rapid changes of location and easy preparation for use.

In the description which follows below, reference is made to the accompanying drawings in which one embodiment of the invention is shown by way of example, only, and in which.

Figure 1:
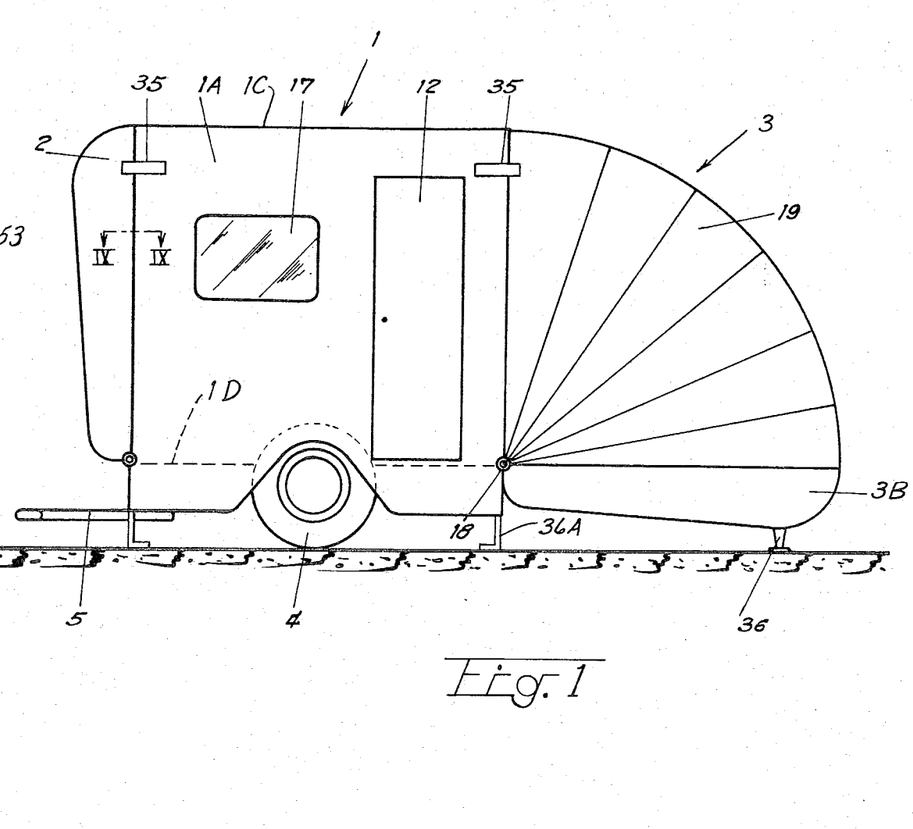
FIGURE 1 is a side view of a travel trailer embodying the invention and showing one end wall unit in the position of use.

The travel trailer which is illustrated in FIGURE 1 essentially consists of three separate parts, namely, a rigid, tube-like body structure 1, a front end wall unit 2 and a rear end wall unit 3.

The rigid body structure 1 has side walls 1A and 1B, a roof 1C and a floor 1D. A conventional wheel assembly 4 and drawbar assembly 5, together with ancillary devices for suspension, braking, control and the like are mounted upon the body structure 1. The outside shell of the central body structure 1 and the outside end walls 2B and 3B are preferably, but not necessarily, fabricated by molding from plastic. Also, the body structure 1 may include an inner shell with insulating material between the inner and outer shells.

The front end of the body structure 1 is closed off by the end wall unit 2 which includes an inner partition wall 2A on the inner side of two storage spaces 6 and 6A. The partition 2A has openings for access to the storage spaces 6 and 6A which are separated by a passageway 7 in which a hinged door 7A is hung. A channel 8 is formed by the wall member 8A around the said storage spaces and the door along the side walls 1A and 1B and the roof 1C.

Figure 3:
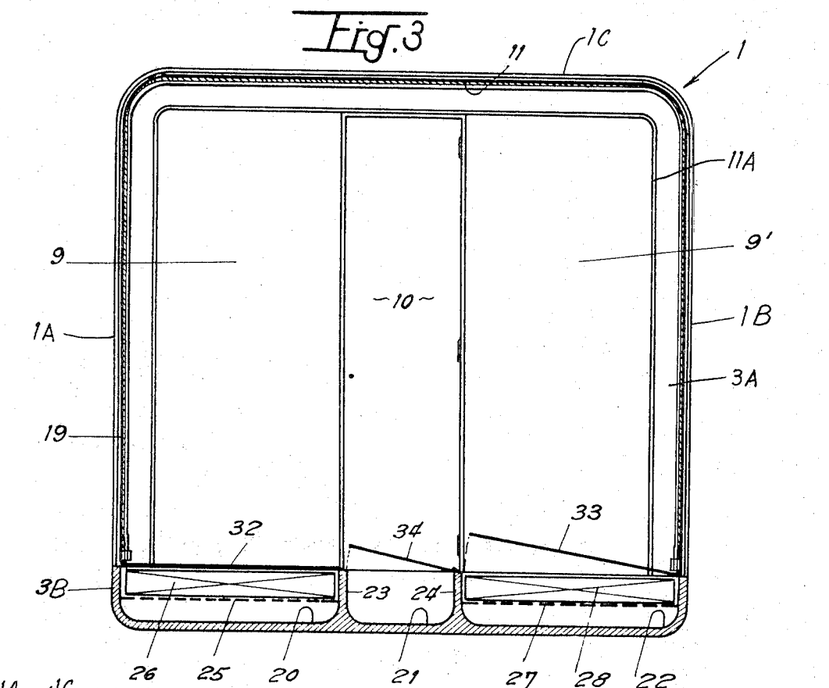
FIGURE 3 is a sectional view taken along the line III—III in FIGURE 2.

Similarly, the rear end of the body structure 1 may be closed off by a partition wall 3A with storage spaces 9 and 9A, a door 10 and a channel 11 (as shown in FIGURE 3).

The interior of the body structure 1 can be arranged and/or furnished as desired and in a range from the most simple to the most luxurious.

Figure 2:
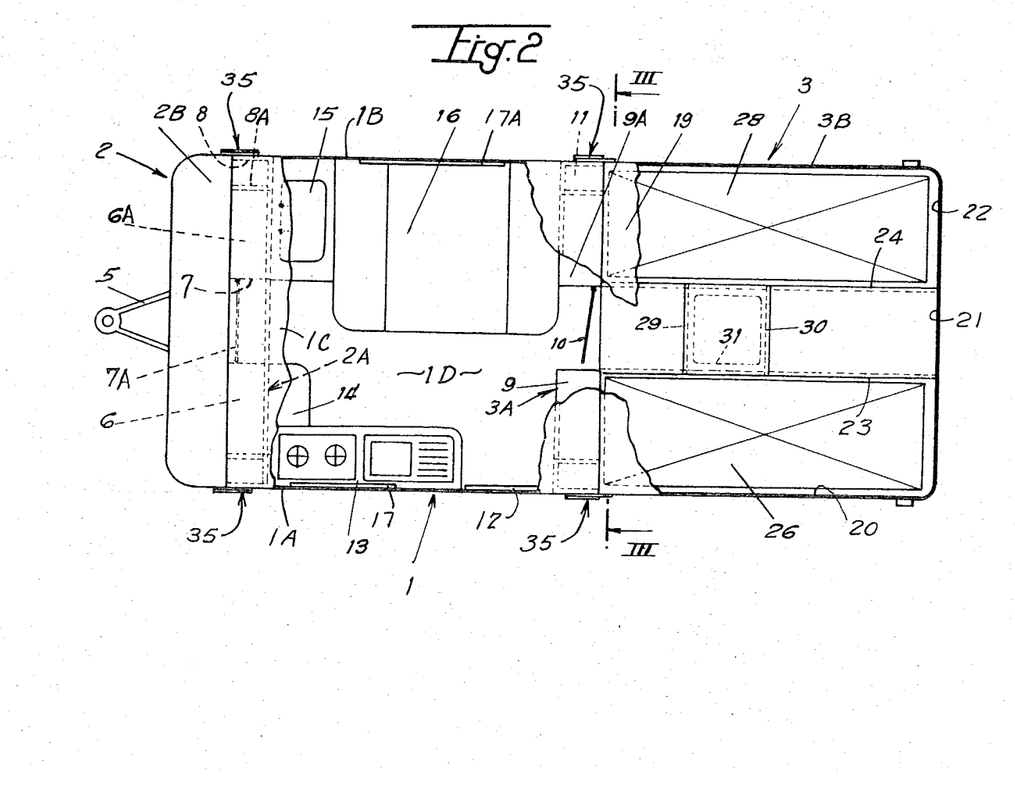
FIGURE 2 is a top plan view in which parts of the roofing elements are broken away.

FIGURE 2 shows, by way of example, a kitchen sink and adjacent heating apparatus 13 located next to the door 12. A corner table 14 and, on the opposite side of the door 7, a wash basin 15 are placed against the partition wall 2A. A folding table 16, which can either conceal or replace a small bathroom with water closet and shower, is located along the side wall 1B.

However, it would be possible to devise for the "night" arrangement two small separate bathrooms, one for each bedroom, and for the "meal-time" arrangement a large kitchen formed by the total area of the two combined bathrooms.

Side windows can be provided at 17 and 17A in the sides walls 1A and 1B. The body structure 1 will contain the pumps, tanks, storage batteries and other conventional equipment which form part of the cooking and toilet facilities. Some of this equipment can be located under the floor.

The outer end wall 3B is shell-shaped and is pivoted about a horizontal hinge pin 18, and it is separably fastened near its periphery to one of the ends of a folding hood 19 which consists in the example shown of a waterproof fabric braced by U-shaped, metallic hoops. The other end of the said hood is separably attached to the wall 3A within the channel 11, with the result that when the outer wall 3B is in the horizontal position of use (FIGURE 1) the hood 19 forms a covering. When the wall 3B is in the upright position or inoperative position, the hood 19 folds into the corresponding channel 11.

It would be possible to devise side walls for the space above the horizontal outer wall 3B from juxtaposed strips or, alternatively, from articulated side sheets.

In any case, the end wall unit 3 makes it possible to provide a living space which communicates with the interior of the body structure 1 through the door 10 and which can be completely closed off by means of this latter. Also, this space is ideally suited for sleeping purposes.

The outer wall 3B is preferably molded with three parallel troughs 20, 21 and 22 which are separated by the vetrical partitions 23 and 24. The troughs 20 and 22 can be fitted with conventional box springs 25 and 27, and also with conventional mattresses 26 and 28, respectively, so as to form two comfortable beds which are a great improvement over the beds of the type usually provided in travel trailers of similar dimensions.

The widths of the mattresses 26 and 28 can be of the order of 70 centimeters while at the same time affording a central passageway which is 60 centimeters in width. However, if the passageway is only 40 centimeters wide, mattresses 80 centimeters in width can accordingly be made available.

The central trough 21 is divided by two short transverse partitions 29 and 30 so as to form three separate boxes or lockers which can be used for storing objects not frequently in use. However, the partitions 29 and 30 are preferably arranged so that a window 31 (FIGURE 2) can be set is the outside wall 3B between said partitions on the same level as the rear window in the drawing vehicle. Then, with a similar window placed at the same height in the front end wall 2B, the driver of the drawing motor vehicle can use his central rear view mirror.

The end wall 3B, which has just been described, is completed by means of flooring members 32 and 33, which are hingedly connected to the lateral edges of the end wall 3B and designed to cover the mattresses 26 and 28. The lid 34 which covers the central trough 21, is hingedly connected to the partition 24 and combines with the flooring members 32 and 33 to form a complete floor assembly capable of supporting substantial weight. Thus, the space which is intended to provide a sleeping room at night can be employed during the day either as a living room or as a dinette.

Latch mechanisms 35 (FIGURE 1) include hooks which hold the outside end walls 2B and 3B in their folded back or closed positions. Legs 36 can be provided for supporting the outer end, and thereby insuring the stability of, the outside end walls and the complete assemblies thereon when they are in their horizontal positions.

The length of the travel trailer, which may not exceed approximately two meters at the base when in the closed position thereof, is well suited for an underslung structure which is close to the road and has a low center of gravity for better road-holding qualities and also for minimizing wind resistance. That is, a longer travel trailer requires a greater clearance to avoid engagement of its front and rear ends with the ground when it is uneven, thereby preventing the use of an underslung structure. The low slung body structure permits the storage of the travel trailer in private garages which provide only limited headroom. Furthermore, there is no need for a mounting step at the entrance door 12 to the travel trailer.

The latch mechanism 35 (FIGURE 8) consists of a lever 57 which is pivotally mounted at 58 on a base plate 59 which is secured to the side wall 1A of the body structure 1. The said lever 57, which has an operating handle 60, draws with it in its movement a stirrup 61 which is designed to engage with a hook 62, which is secured to the outside end wall 3B.

Figure 8:
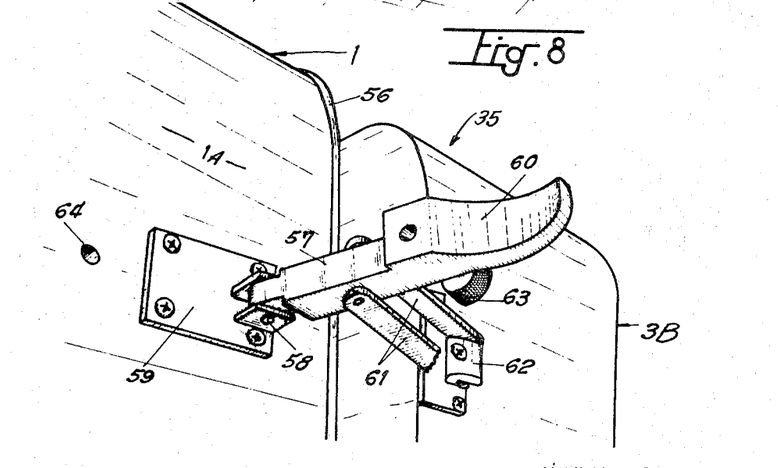
FIGURE 8 is an enlarged, perspective view of a fragment of the travel trailer including the latch mechanism for the end wall units.
Figure 9:
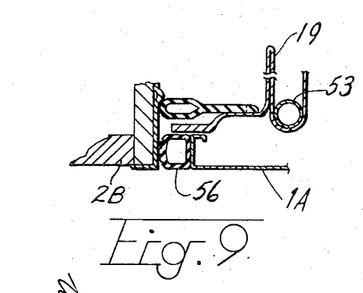
FIGURE 9 is a sectional view taken along the line IX—IX in FIGURE 1.

The said latch mechanism operates by passing beyond the dead-center point in opposition to the yieldable resistance of the healing joint 56 and locks the outside end wall 3B against the body structure. A knurled screw 63 is mounted upon the handle 60 and receivable into the threaded bore 64 for holding the latch in locked position. Other types of latch mechanisms may be used equally effectively.

When arriving on a camping site, the conventional support legs 36A are moved downwardly to support the central body structure. The latch mechanisms 35 are released and the end walls 2B and 3B are lowered onto their support legs 36.

No further operation is required to provide a living space which is three times that of the body structure 1 and which, in standard designs, will be of the order of 12 square meters.

In order to provide sleeping accommodations for four persons, the hinged flooring members 32 and 33 on the end wall 3B and identical flooring members on the end wall 2B are raised and held against the hood 19 whereby the beds 26 and 28 are then ready for use.

When it is time to have a meal or to take shelter indoors, the flooring members 32 and 33 may be placed in the horizontal position to provide a flat and uniform floor space of approximately four square meters which is entirely free and unobstructed. The hoods 19 may be provided with transparent or translucent windows made from flexible material, such as plastic, to provide natural light in this space.

When preparing to leave the camping site, and assuming that the hinged flooring members are initially in the horizontal position and that the beds are thereby held in that position, the outside end walls are simply lifted into their closed positions. However, the lid 34 on each central box is left open so that it does not obstruct the window 31. The hoods 19 fold back into the channels 8 and 11, and it is merely necessary to fasten the end walls 2B and 3B by means of the latch mechanisms 35 in order to be in position of readiness for the road.

Figure 4:
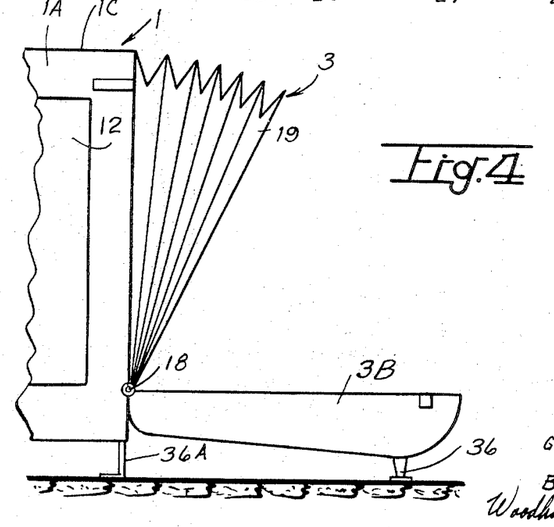
FIGURE 4 is a fragment of FIGURE 1 with the hood in a different position.

FIGURE 4 shows the hood separated from the end wall 3B with a view to converting the living space into a terrace which can be protected from the sun to any desired extent. Thus, the user has at his disposal a travel trailer which enables him to combine the advantages of camping under canvas with the advantages of a travel trailer. Especially the advantages and mobility of a tent combined with the comfort of a travel trailer are provided at a low cost.

The travel trailer of the invention can be converted into a travel trailer of an entirely conventional type, by removing the end walls 2B and 3B, and extending the central body structure by adding either one or a number of body sections of the same type or of shorter length to the central structure. The end walls 2B and 3B are replaced without a hood attached. A conversion of this nature can be readily accompanied by any modifications which may be found necessary in the undercarriage 4 and the coupling system 5. This conversion requires little capital expenditure since the central body structure 1 is already provided with the complete basic elements for toilet, cooking and cupboard facilities which can be arranged as desired. The body sections or extension units to be added can, therefore, be readily chosen among a few types which are adapted to the users' requirements in regard to sleeping accommodations, but which are also manufactured on a large-scale production basis.

Figure 5:
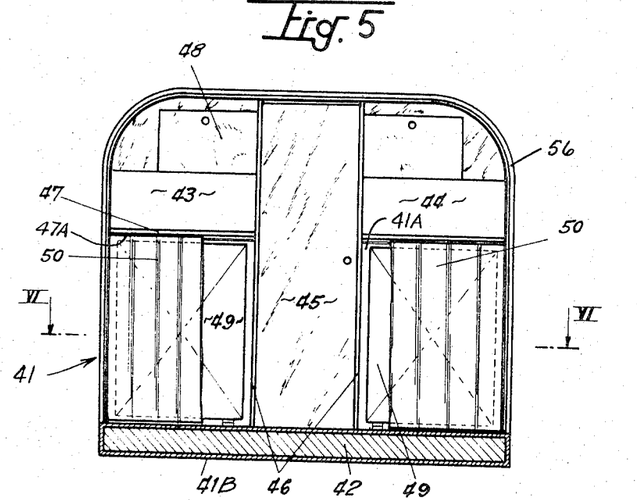
FIGURE 5 is a sectional view similar to that of FIGURE 3 and showing another arrangement for the end wall unit.
Figure 6:
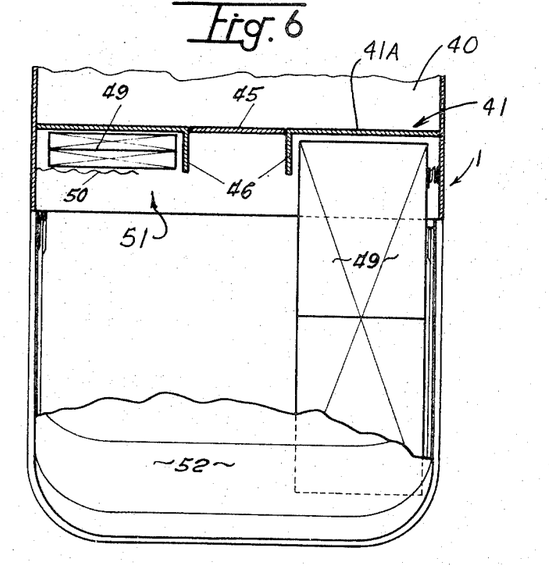
FIGURE 6 is a sectional view taken along line VI—VI in FIGURE 5.

The embodiments disclosed in FIGURES 5, 6 and 10 will now be described, it being understood that the external appearance of the travel trailer illustrated therein is preferably the same as that which is shown in FIGURE 1.

However, in this embodiment, the end wall unit 41 consists of an outer end wall 41B preferably having a box-frame structure which, for example, may be made from plastic material A packing, also of plastic material, may be injected into the said box-frame to increase the structural rigidity of the end wall 41B and to provide a higher degree of insulation. The inner partition 41A consists in part of two symmetrical cabinet members 43 and 44 which are separated by a door 45. Each cabinet member comprises an upright frame 46, a shelf 47 and a locker 48. The complete assembly of the end wall unit 41 provides an end frame which imparts much rigidity to the body structure 1. Auxiliary equipment can be housed in the cavity below the floor 40 which can also be insulated.

The space 47A which is located underneath each shelf 47 is designed to accommodate a folding bed 49 of known type which can also be concealed by a curtain 50 when in the closed, vertical position. FIGURE 6 shows that the partition 41A is set back from the end edge of the tube-like body structure 1 to form a storage space 51 within which the hood 52 is housed in its folded or collapsed position. One of the beds 49 is shown in the storage position within the space 51 and the other bed is shown in the position which it occupies when it is ready for use.

Figure 7:
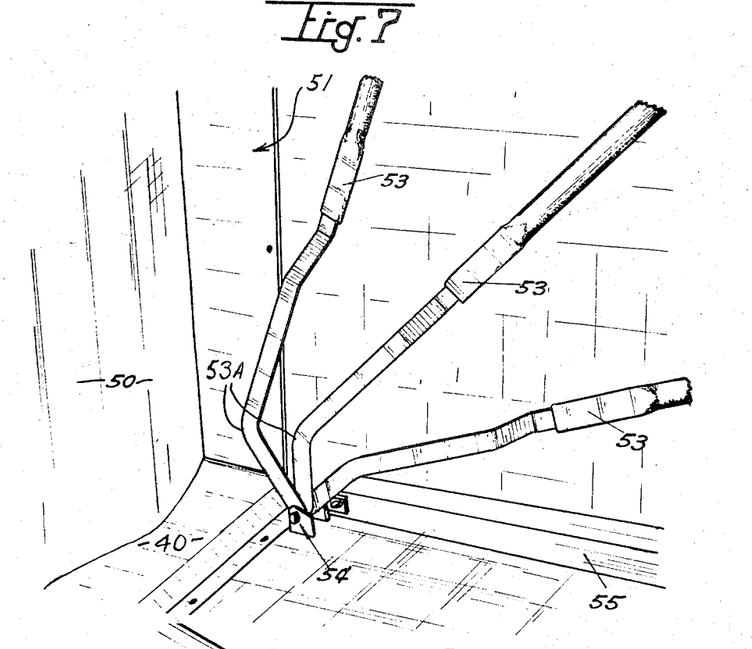
FIGURE 7 is an enlarged, perspective view of a fragment of the hood supporting mechanism.

As shown in FIGURE 7, the three U-shaped hoops 53, which support the hood 52, are adapted to fit inside the space 51 in front of the curtain 50. That is, by lifting the end wall 41B, the said hoops are pivoted about the pivot pin 54 which is mounted on the end wall 41B. The three hoops 53 have elbows 53A of decreasing distance from the pivot pin 54 so they will occupy adjacent vertical positions when in their folded condition. The bottom or outer edge of the hood 52 is fitted with a sealing joint 55 which may be releasably secured to the end wall 41B by means of snap fasteners, guide strips or like fastening means of known types.

Even if the sealing joint is detached from the end wall 41B, for the purpose of utilizing the hood in the manner shown by way of example in FIGURE 4, said sealing joint bears against the end wall 41B in its closed position and accordingly performs its sealing function, thus augmenting the sealing action of the sealing joint 56 (FIGURE 8) which is normally provided between the adjacent edge of the body structure 1 and the plane face of the end wall 41B engaged thereby.

Figure 10:
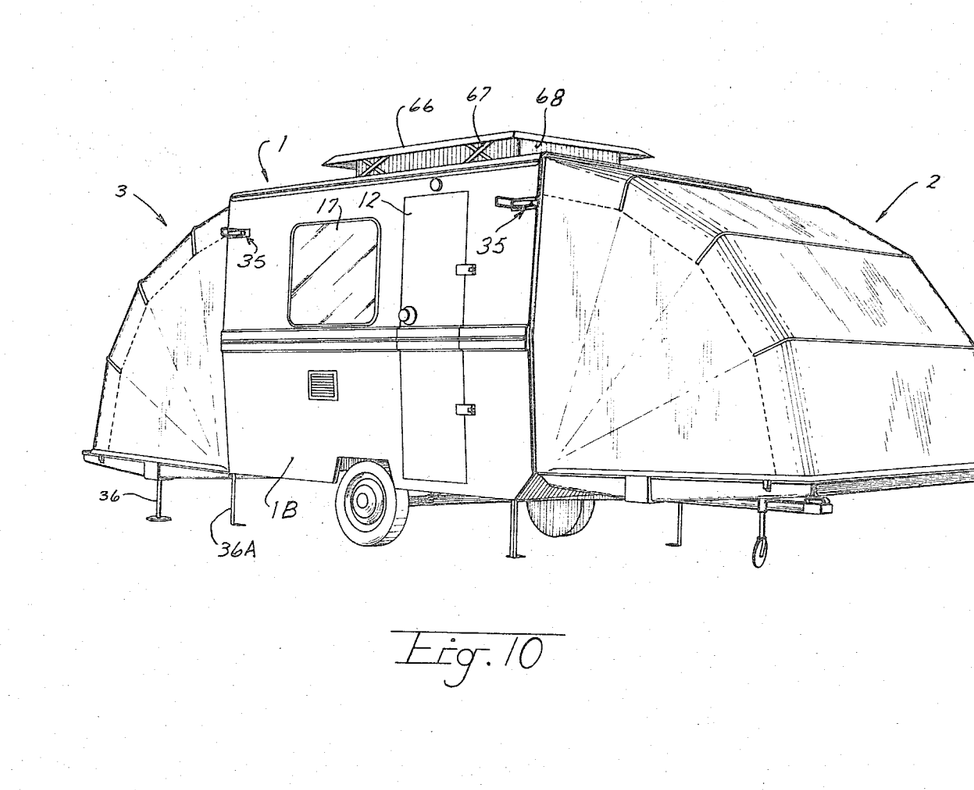
FIGURE 10 is a perspective view of a travel trailer embodying the invention with both end wall units in the position of use.

As shown in FIGURE 10, the roof of the body structure 1 may have a central portion 66 which is mounted upon the remainder of the roof by scissors means 67 for movement between a position flush with said roof and an elevated position. Perforate side flanges 68 depend from the lateral edge of said roof portion 66 to close the space between said portion and the roof when said portion is elevated.

It will be understood that the embodiments which have been described above are solely for illustrative purposes, and that a large number of modifications can be made therein without departing from the scope of or the spirit of the invention.

The embodiments of the invention in which an exclusive property or privilege is claimed are defined as follows:

1. A habitable vehicle, comprising:
  a tube-like central wall structure defining the roof, floor and two sides of an open-ended living space;
  a wheeled undercarriage supporting said well structure;
  draft mechanism connected to said wall structure;
  transverse end wall units located at the forward and rearward ends of said wall structure, at least one wall unit comprising a rigid inner partition wall fixedly located within said wall structure near one end thereof and extending completely across the interior of the wall structure, said partition wall having a door opening therein, and an outside wall hingedly supported along one edge thereof upon said one end of said wall structure, said outside end wall being movable between a horizontal open position and an upright closed position adjacent to but spaced from the partition wall; and
  collapsible hood means mounted upon said wall structure and adapted to enclose the space above said outside end wall and adjacent said partition wall when said outside end wall is in the open horizontal position, said hood means being located between said outside end wall and said partition wall when said outside end wall is in the upright closed position.

2. A vehicle in accordance with claim 1, wherein the outside end wall has a pair of lengthwise troughs separated by a central passageway;
  bed means in said troughs; and
  including movable cover panels mounted upon said end walls and positioned to form a floor over the bed means and the passageway.

3. A vehicle in accordance with claim 1, wherein each outside end wall is adapted to support bed means in the horizontal position thereof, said bed means being housed within said space between the outside end wall and the corresponding inner partition wall when said bed means is in the vertical position.

4. A vehicle in accordance with claim 1, wherein said outside end wall has a substantially rectangular and planar central portion and a rim portion extending completely around the edges of said central portion, the rim portion being substantially transverse to the plane of said central portion, said rim portion being positioned against and in sealing engagement with the respective edges of the roof, floor and sides of the central wall structure when said end wall is in the upright closed position; and
  wherein said central portion and said partition wall define an enclosure when said outside end wall is in the upright closed position with said hood means stored within said enclosure.

5. A vehicle in accordance with claim 1, wherein said outside end wall is positioned in its upright position against said one end of said wall structure; and
  including latch means for rigidly securing said outside end wall to said central wall structure.

6. A vehicle in accordance with claim 1, wherein both wall units have hinged outside end walls, inner partition walls, and cooperating hood means to define collapsible living spaces at both ends of the vehicle.

7. A vehicle in accordance with claim 5, wherein said partition walls define the lengthwise ends of the living space within the body structure;
  wherein the door openings in the end wall units are aligned lentghwise of said body structure;
  wherein the outside end walls of each end wall unit have a pair of spaced, lengthwise troughs and a window therebetween, each window being aligned with said door openings and at substantially the same distance from the ground as the rear window of the motor vehicle which is connected by the drawbar mechanism;
  wherein bed means is disposed within said troughs for movement therewith;
  wherein panel means is hingedly secured upon the inner side of each outside end wall for movement with respect thereto between a first position covering the bed means and a second position substantially perpendicular to said outside end walls and adjacent said hood means;
  wherein said panel means includes fastening means for holding same in said perpendicular positions;
  wherein the roof of said body structure has a central portion movable from a position flush with said roof to an elevated position, said central portion having integral, downwardly extending and perforate side flanges;
  wherein said hood means is a flexible, moisture-repellent fabric supported by a plurality of U-shaped members hingedly mounted upon said outside end wall for movement around an axis close to the hinge axis of said outside end wall;
  wherein said water-repellent material has window means therein;
  wherein the floor in said body structure is below the upper portion of the undercarriage;

wherein said U-shaped members have substantially parallel portions which are dog-legged toward the partition wall; and including lock means for positively connecting the upper end of each outside end wall to the adjacent portion of the body structure when said outside end walls are in their upright positions.

8. A vehicle in accordance with claim 1, wherein said hood means is braced by U-shaped hoops which are pivotally mounted at their free ends along an axis close to the hinge axis of said outside end wall.

9. A vehicle in accordance with claim 8, including means defining a U-shaped compartment between said partition wall and the adjacent edge of said body structure; and wherein the hood means is adapted to fit when in the collapsed position inside the space defined by said U-shaped compartment.

10. A vehicle in accordance with claim 8, wherein the hood means can be separated from the outside end wall and including means for holding said hood means in intermediate positions.

References Cited

UNITED STATES PATENTS

| 512,273 | 1/1894 | Brown. | |
|---|---|---|---|
| 1,715,971 | 6/1929 | Wilson. | |
| 3,284,128 | 11/1966 | Alarie | 296—23 |

FOREIGN PATENTS 678,703   1/1930   France.

BENJAMIN HERSH, *Primary Examiner.*

PHILIP GOODMAN, *Examiner.*